United States Patent [19]
Lyon

[11] Patent Number: 5,456,576
[45] Date of Patent: Oct. 10, 1995

[54] DYNAMIC CONTROL OF TIP CLEARANCE

[75] Inventor: Bruce V. Lyon, Palm Beach Gardens, Fla.

[73] Assignee: United Technologies Corporation, Hartford, Conn.

[21] Appl. No.: 299,132

[22] Filed: Aug. 31, 1994

[51] Int. Cl.[6] ............................................. F01D 11/08
[52] U.S. Cl. ............................ 415/173.3; 415/174.2
[58] Field of Search ............................ 415/173.1, 173.3, 415/174.2; 416/228, 237

[56] References Cited

U.S. PATENT DOCUMENTS

| | | | |
|---|---|---|---|
| 3,117,716 | 1/1964 | Wernicke | 415/173.3 |
| 5,211,534 | 5/1993 | Catlow | 415/174.2 |
| 5,344,284 | 9/1994 | Delvaux et al. | 415/173.3 |

FOREIGN PATENT DOCUMENTS

| | | | |
|---|---|---|---|
| 2580033 | 10/1986 | France | 415/173.3 |
| 1403277 | 10/1968 | Germany | 416/237 |
| 0066602 | 5/1980 | Japan | 416/228 |
| 0152906 | 7/1986 | Japan | 415/173.3 |
| 1020900 | 2/1966 | United Kingdom | 415/173.3 |
| 2129880 | 5/1984 | United Kingdom | 415/173.3 |

*Primary Examiner*—Edward K. Look
*Assistant Examiner*—Mark Sgantzos
*Attorney, Agent, or Firm*—Marina F. Cunningham

[57] ABSTRACT

A gas turbine engine (10) includes a plurality of rotor blades (24) having a root (33) and a tip (34) and a pressure side (32) and a suction side (30). The rotor blades (24) are enclosed in an engine case (11). A variable position engine case liner (50) is disposed radially inward of the engine case (11) and radially outward of the rotor blade tips (34). Biasing mechanism (60), disposed between the liner (50) and the engine case (11), urge the liner (50) radially inward from the engine case (11). The tips (34) of the rotor blades (24) are angled with respect to the direction of rotation of the blades (24) on the pressure side (32) thereof to deflect pressurized air against the liner (50). The liner (50) adjusts its position to maintain a minimum tip clearance (70) between the liner (50) and the tips (34) of the rotor blades (24) during different operating conditions of the gas turbine engine (10).

9 Claims, 3 Drawing Sheets

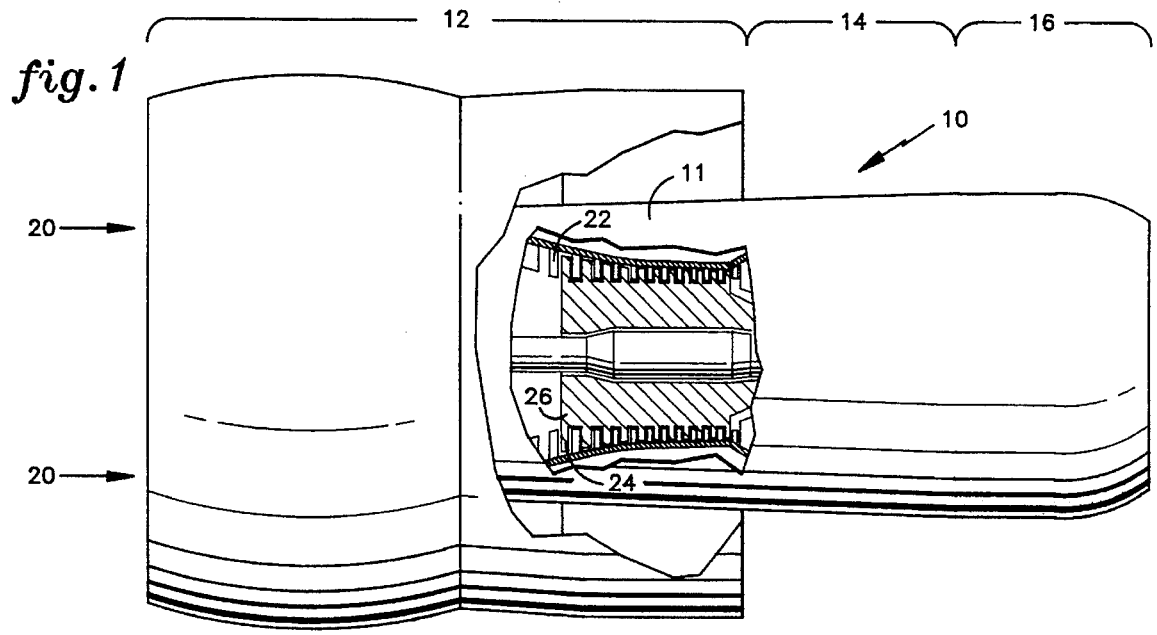
fig.1
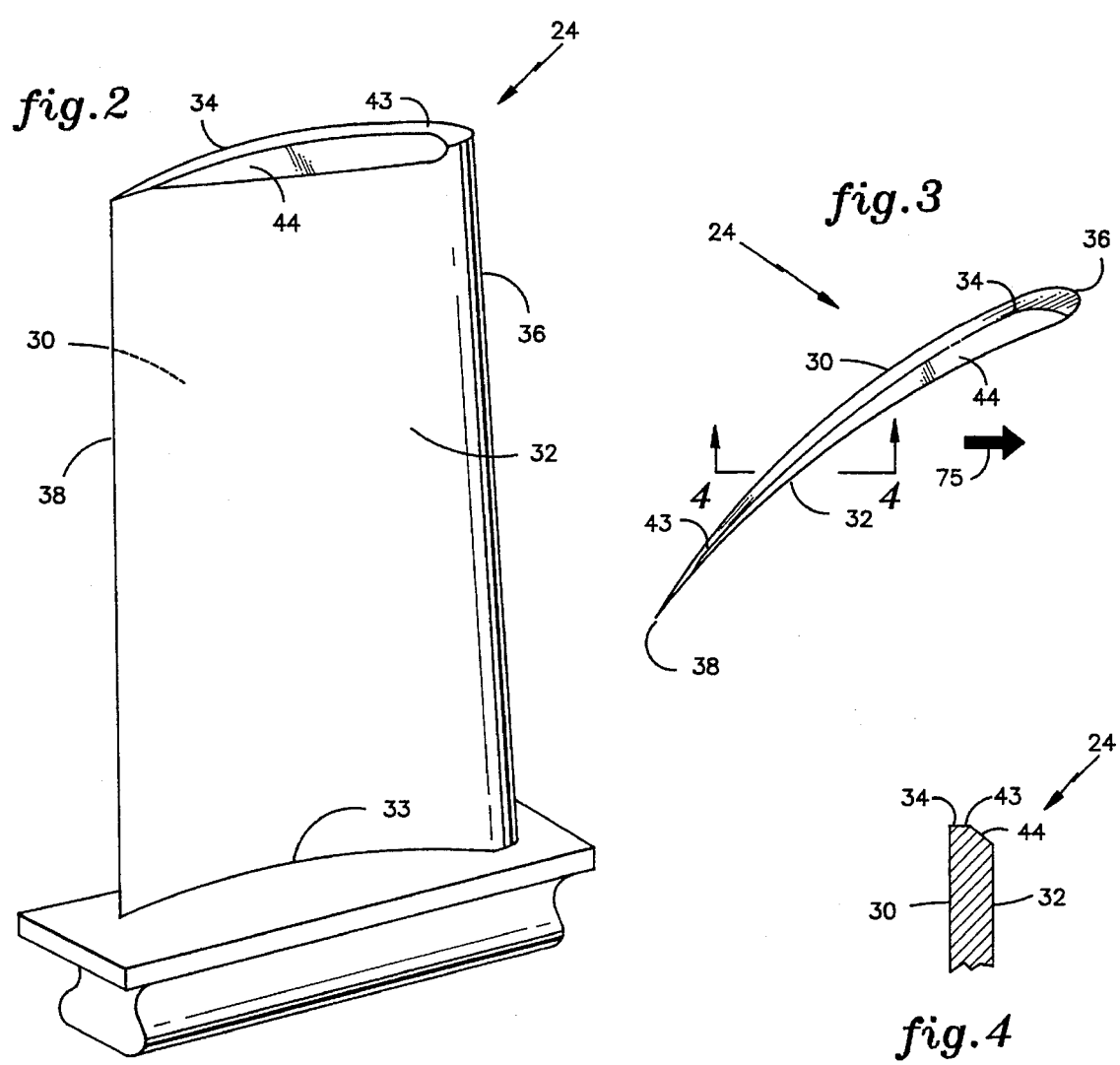
fig.2
fig.3
fig.4

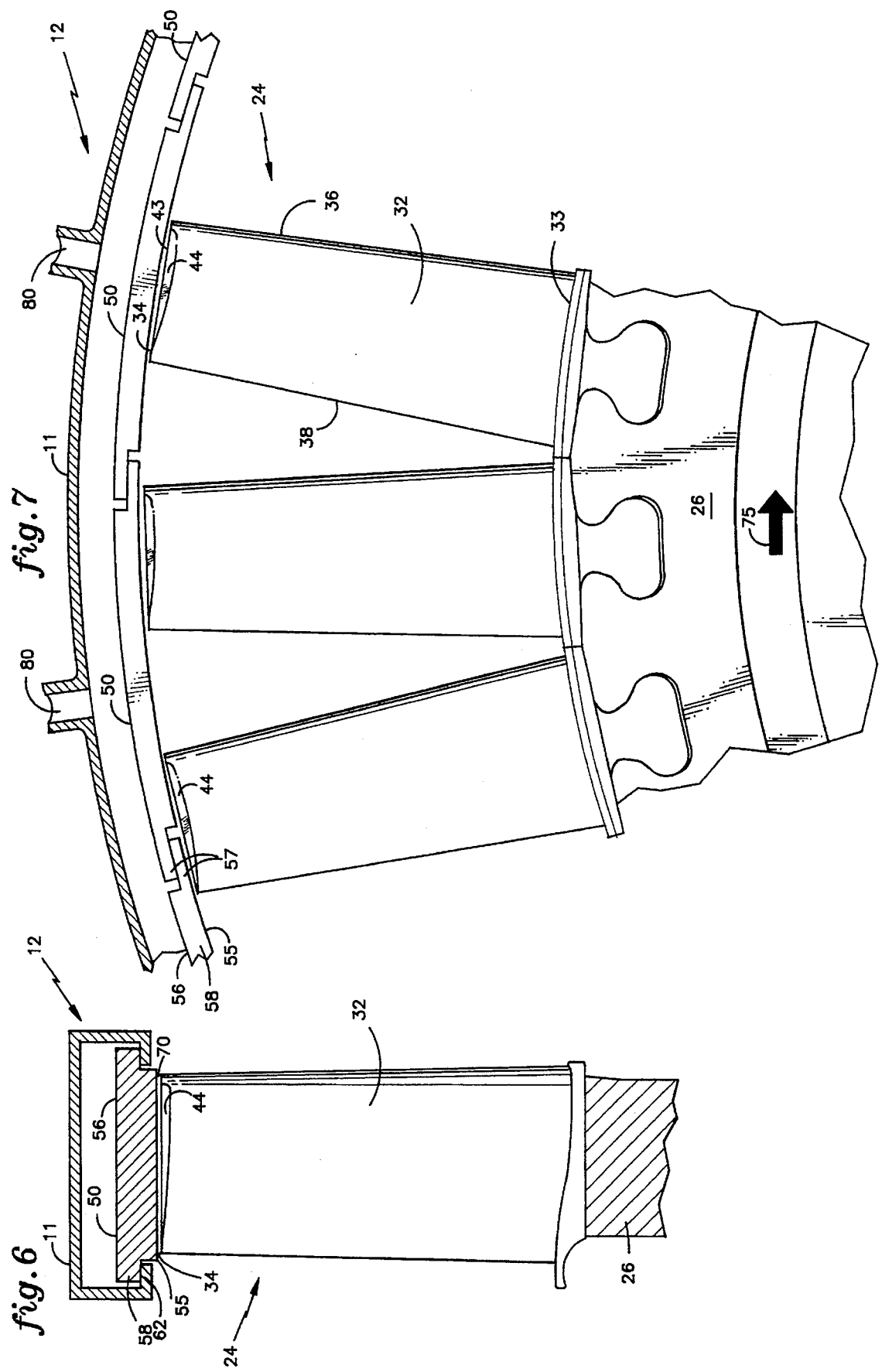

DYNAMIC CONTROL OF TIP CLEARANCE

TECHNICAL FIELD

This invention relates to gas turbine engines and, more particularly, to tip clearance between the compressor case and the tips of rotor blades.

BACKGROUND OF THE INVENTION

Conventional gas turbine engines are enclosed in an engine case and include a compressor, a combustor, and a turbine. Air flows axially through the sections of the engine. The air, compressed in the compressor, is mixed with fuel which is burned in the combustor and then expanded in the turbine, thereby rotating the turbine and driving the compressor.

The compressor includes alternating rows of rotating airfoils or rotor blades and stationary airfoils or vanes. Each rotor blade has a leading edge and a trailing edge extending from a root of the blade to a tip thereof and a pressure side and a suction side. Each rotor blade is secured onto a rotor disk. Each row or stage of airfoils contributes to the compression of the air. Thus, the pressure of the air upon leaving each stage at the trailing edges of the blades is higher than the pressure of the air upon entering each stage at the leading edges of the blades. Also, the pressure side of the blade has higher pressure air than the suction side thereof.

A problem arises when a relatively large tip clearance exists between the tips of the compressor rotor blades and the engine case. The tip clearance allows the higher pressure air from the pressure side of the blades to leak into the lower pressure suction side area of the blades. The leakage causes inefficiencies in the gas turbine engine performance, because the higher pressure leaked air must be compressed again, thereby requiring the compressor to perform some portion of work more than once.

The size of the tip clearance varies with the operating conditions of the gas turbine engine and is associated with different amounts and rates of expansion and contraction of the engine case and the rotor assembly. The expansion and contraction of the engine case is a function of the pressure and temperature, whereas the expansion and contraction of the rotor and blade assembly is affected by centrifugal force and the temperatures of the rotor and the disk within the compressor. Also, the engine case and the rotor assembly are fabricated from different materials, each having different coefficients of expansion. The comparative mass of the rotor assembly and the engine case is another contributing factor to the variations in the tip clearance during transient stages of the engine operation. Since the rotor assembly has greater mass than the engine case, it takes a longer time to heat the rotor assembly than it does to heat the engine case. Consequently, the engine case expands faster than the rotor assembly.

As the gas turbine engine begins to operate, the rotor expands almost immediately due to the centrifugal force, reducing the tip clearance. Then, the engine case expands due to the increase in pressure, thereby increasing the tip clearance. The amount of expansion of the engine case due to the increase in pressure is different from the amount of expansion of the rotor assembly. Subsequently, the engine case is subjected to thermal expansion due to increased temperature, further increasing the tip clearance. The rotor and blade assembly also expands thermally due to increased temperature, reducing the tip clearance. The rate of thermal expansion of the rotor assembly is slower than the rate of thermal expansion of the engine case, because the rotor assembly is much heavier than the engine case, and therefore, the rotor takes a longer time to heat up. Hence, the tip clearance between the tips of the blades and the engine case changes non-uniformly, frequently resulting in a relatively large gap that allows leakage of higher pressure air to the lower pressure air area, thus resulting in engine inefficiency.

In one attempt to minimize tip clearance, conventional gas turbine engines use an abradable liner within the engine case. The tips of the rotor blades make contact with the abradable liner, carving out the material therefrom. At a certain point of operation, the tip clearance will be zero, but at all other points of operation, there will be a gap between the tips of the rotor blades and the liner caused by the removal of material by abrasion, allowing the undesirable leakage of higher pressure air into the lower pressure air area. An additional problem with abradable liners is that during hard landings or airplane turns the rotor deflects differently than the engine case. As a result, the rotor blades carve out additional material from the abradable liner, thereby enlarging tip clearance permanently.

Another approach used to minimize tip clearance is to fabricate a greater mass engine case to more closely match the effective thermal expansion rate of the greater mass rotor and blade assembly. Although this approach minimizes the tip clearance during some operating conditions of the gas turbine engine, it increases the tip clearance at idle. Also, this approach results in an undesirable increase in the overall weight of the engine.

Another solution used to reduce the tip clearance is to eliminate thermal mismatch between the engine case and the rotor assembly. This effect is achieved by pumping hot or cool air around the case to correlate thermal expansion and contraction of the engine case with that of the rotor and blade assembly. There are a number of drawbacks associated with this procedure. First, the procedure requires expensive, complicated hardware to control the thermal expansions and contractions. Second, the additional hardware results in a weight penalty. Finally, the approach requires bleeding hot and cool air from the engine, thereby resulting in inefficiency.

Thus, currently there is still a great need to effectively minimize tip clearance between the tips of the rotor blades and the engine case liner.

DISCLOSURE OF THE INVENTION

It is an object of the present invention to increase the overall efficiency of a gas turbine engine.

It is a further object of the present invention to minimize tip clearance between tips of rotor blades and an engine case liner throughout all stages of the gas turbine engine operation.

According to the present invention, a gas turbine engine includes a variable position engine case liner disposed radially inward of an engine case and radially outward of rotor blade tips, that varies its position during different engine operating conditions, so that tip clearance between the tips of the rotor blades and the engine case liner is minimized during all engine operating conditions. The gas turbine engine includes a plurality of rotor blades having an angled surface at the tip of the pressure side of each blade. The angled or beveled surface deflects high pressure air towards the liner, thereby exposing the liner to the dynamic pressure resulting in a radially outward force upon the liner.

To maintain the liner close to the tips of the blades, the liner is subjected to a radially inward force from a biasing means disposed between the liner and the engine case. Thus, the liner varies its position with respect to the tips of the rotor blades so that a minimal tip clearance is maintained between the tips of the rotor blades and the liner.

With the present invention, the minimum tip clearance is maintained throughout all stages of gas turbine engine operation without having a significant weight penalty and without the addition of complicated hardware.

The foregoing and other objects and advantages of the present invention become more apparent in light of the following detailed description of the exemplary embodiments thereof, as illustrated in the accompanying drawings.

BRIEF DESCRIPTION OF THE DRAWINGS

FIG. 1 is a simplified, partially sectioned elevation of a gas turbine engine employing the present invention;

FIG. 2 is an enlarged, isometric view of a rotor blade of FIG. 1, according to the present invention;

FIG. 3 is an enlarged, plan view of the rotor blade of FIG. 2;

FIG. 4 is a section of FIG. 3 taken along line 4—4 in the direction of rotation of the rotor blade;

FIG. 6 is a simplified, cross-sectional elevation of FIG. 5; and

FIG. 7 is an enlarged, isometric view of a compressor cross-section with an adjustable engine case liner, according to another embodiment of the present invention.

BEST MODE FOR CARRYING OUT THE INVENTION

Figure 5:
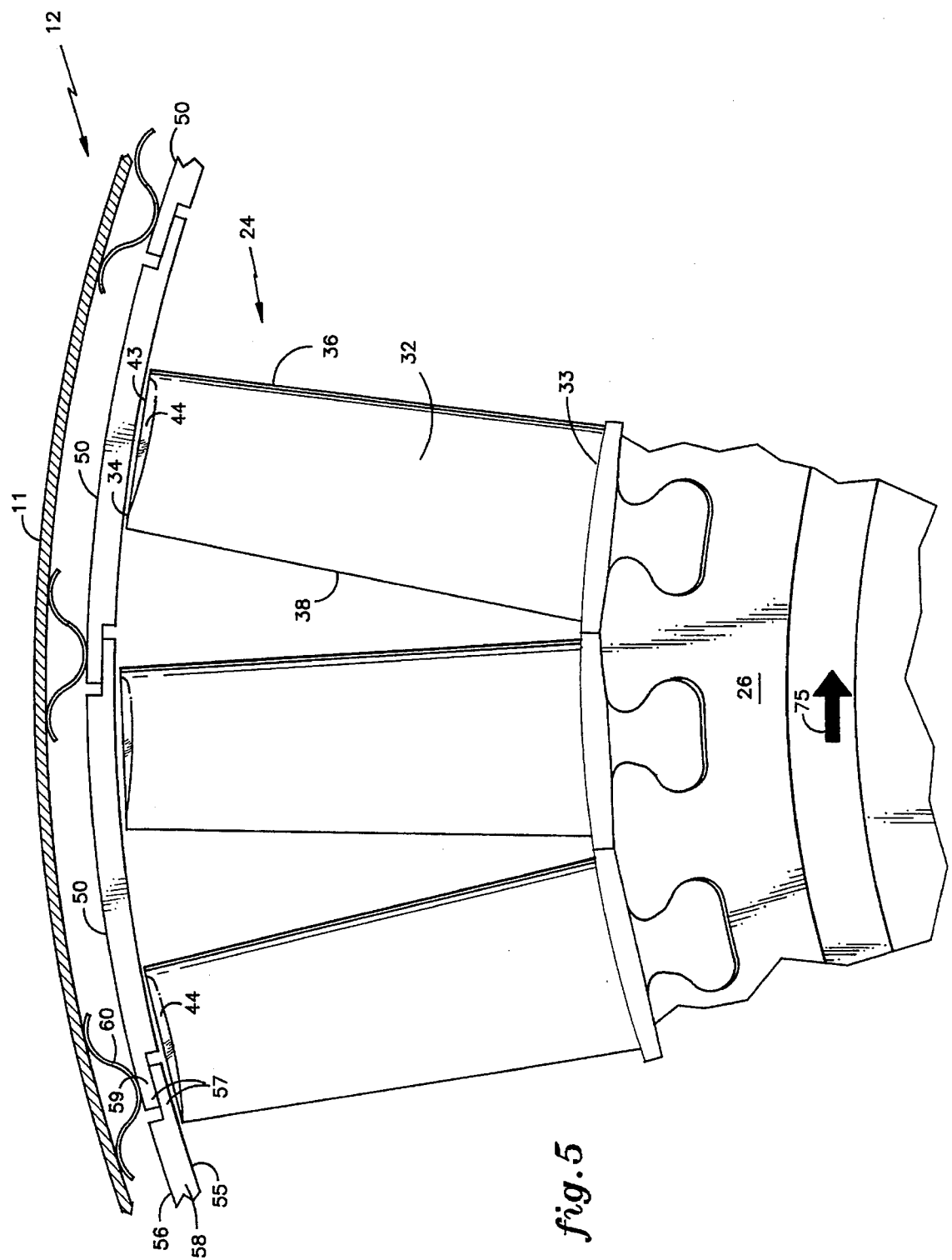
FIG. 5 is an enlarged, isometric view of a compressor cross-section with an adjustable engine case liner, according to the present invention.

Referring to FIG. 1, a gas turbine engine 10 is enclosed in an engine case 11 and includes a compressor 12, a combustor 14, and a turbine 16. Air 20 flows axially through the sections 12, 14, 16 of the engine 10. Air 20, compressed in the compressor 12, is mixed with fuel which is burned in the combustor 14 and then expanded in the turbine 16, thereby rotating the turbine 16 and driving the compressor 12. The compressor 12 includes a plurality of alternating rows of stationary airfoils or vanes 22 and rotating airfoils or rotor blades 24. The rotor blades 24 are secured onto a rotor disk 26. Each row or stage of airfoils contributes to compression of the air 20.

Referring to FIG. 2, each rotor blade 24 has a suction side 30 and a pressure side 32 extending from a root 33 of the rotor blade 24 to a tip 34 thereof and from a leading edge 36 to a trailing edge 38. Each tip 34 of each rotor blade 24 includes a substantially flat tip surface 43 adjacent to the suction side 30 and a beveled or angled surface 44 on the pressure side 32 thereof, as also shown in FIGS. 3 and 4. The beveled surface 44 extends substantially over the full length of the tip of the blade, without chamfering the very leading edge 36 or the trailing edge 38.

Referring to FIGS. 5 and 6, the engine case 11 includes a plurality of variable position engine case liners 50 disposed radially inward thereof. Each liner 50 includes an inner side 55, an outer side 56, stepped liner ends 57 extending in circumferential direction and running in the forward and aft direction of the engine 10, and aft and forward edges 58 extending in the forward and aft direction and running in the circumferential direction. The liner ends 57 of any two adjacent liners 50 are stepped in opposite relationship so that they overlap with each other at a Z-shaped joint 59. The joint 59 provides contact between adjacent liner segments 50.

A plurality of springs 60, disposed between the engine case 11 and the liners 50, urge each liner 50 away from the engine case 11 and toward the blades 24. The springs 60 apply force upon the liners at the joint 59. The radially inward movement of the liners 50 is restricted by a plurality of stops 62 running circumferentially around the case 11. The stops 62 support the aft and forward edges 58 of the liners 50 and limit the radially inward movement thereof.

The flat tip surface 43 of the tip 34 and the inner sides 55 of the liners 50 define a tip clearance 70 therebetween, as shown in FIG. 6. During all the operating conditions of the gas turbine engine 10, the tip clearance 70 between the flat tip surfaces 43 of the blades 24 and the inner sides 55 of the liners 50 should be minimized. When the gas turbine engine 10 is not operating, the tip clearance 70 is minimal, approximately 0.0508–0.1270 millimeters. The liner 50 is urged by the spring 60 to rest against the stops 62. As the engine 10 begins to operate, the blades 24 rotate clockwise, as designated by arrow 75 in FIGS. 3, 5. The air pressure on the pressure side 32 of the blade 24 builds up and becomes higher than the air pressure on the suction side 30. As the speed increases, blade and liner expansions and contractions are increased, but at different times and rates. As the pressure in the compressor 12 builds up, the pressure of the air at the pressure side 32 of the blade and at the tip 34 also builds up. The beveled surface 44 deflects the air towards the liner 50, thereby producing the dynamic pressure and exposing the liner 50 thereto. The liner 50, subjected to the radially outward force caused by the dynamic pressure, moves radially outward toward the engine case 11, thereby overcoming and compressing the spring 60. As the spring 60 is compressed, the liner 50 moves radially outward allowing the blades 24 to rotate without coming into contact with the inner side 55 of the liner 50, and not having a large tip clearance 70 between the tips 34 of the rotor blades 24 and the inner side 55 of the liner 50.

The process is iterative and self correcting. When the tip clearance 70 is too small, since there is no path between the tip 34 and the liner 50 for the high pressure air to leak out through, the pressure builds up between the beveled surface 44 and the inner side 55 of the liner 50, thereby overcoming the spring 60 and forcing the liner 50 radially outward. If the tip clearance 70 is too large, the high pressure air between the beveled surface 44 and the liner 50 leaks out to the lower pressure suction side 30 of the rotor blade 24. As the higher pressure air leaks out, the pressure of the air between the beveled surface 44 and the liner 50 is reduced and the spring 60 forces the liner 50 radially inward, thereby reducing the tip clearance 70. Thus, the liner 50 position with respect to the tips 34 of the blades 24 is continuously readjusted, thereby maintaining a substantially constant and minimal tip clearance 70 therebetween.

The dimensions and angle of the beveled surface 44 with respect to the directions of the rotation of the blades vary at each stage of rotor blades 24 within the compressor 12. The dimensions and angle of the beveled surface 44 also depend on specific characteristics of the compressor 12 and the spring 60. Although the best mode embodiment depicts the rotor blades 24 as having the substantially flat tip surface 43, the flat tip surface 43 is not essential to the present invention. The flat tip surface 43 has the advantage of not being worn away upon the contact with the liner 50 as quickly as a sharp tip would be.

As another embodiment of the present invention, the position of the liner 50 may be adjusted by tailoring the geometry of the airfoil 24 and not including the bevel. Tilting the airfoil 24 or altering its geometry so that the airfoil tip 34 is angled with respect to the direction of rotation thereof would provide the same results as the beveled surface 44. The tip 34 of the airfoil 24 angled with respect to the direction of rotation will deflect high pressure air towards the liner 50 in the same manner as the beveled surface 44.

Furthermore, although the above described embodiment of the invention depicts the spring 60 as a biasing means, other biasing means, such as pressurized air bled from a higher compressor stage and pumped through pipe 80 between the liner 50 and the engine case 11, may be employed, as shown in FIG. 7. The difference in the pressure radially outward of the liner 50 and radially inward of the liner 50 would effectuate liner adjustment.

Although the invention has been shown and described with respect to exemplary embodiments thereof, it should be understood by those skilled in the art that various changes, omissions, and additions may be made thereto, without departing from the spirit and scope of the invention. For example, the liner ends 57 may have straight edges rather than Z-shaped edges. Also, the inner side 55 of the liners 50 can be fabricated either smooth or abradable.

I claim:

1. A gas turbine engine including a plurality of rotor blades enclosed in an engine case, each said rotor blade having a root and a tip and a pressure side and a suction side, said gas turbine engine characterized by:

a plurality of variable position engine case liners disposed radially inward of said engine case and radially outward of said tips of said rotor blades, said plurality of engine case liners resiliently supported within said engine case and capable of radial movement therein; and each said rotor blade having an angled surface with respect to direction of rotation of said rotor blades on said pressure side of said rotor blade so that high pressure air is deflected from said angled surface radially outward to move said variable position engine case liner radially outward.

2. The gas turbine engine according to claim 1, further characterized by biasing means disposed between said engine case and each said liner, said biasing means urging said liner radially inward from said engine case.

3. The gas turbine engine according to claim 2, further characterized by said biasing means being a spring.

4. The gas turbine engine according to claim 2, further characterized by said biasing means being air pumped therebetween.

5. The gas turbine engine according to claim 1, further characterized by a plurality of stops disposed radially inward of said liner, said plurality of stops limiting radially inward movement of said liner.

6. The gas turbine engine according to claim 1, further characterized by each said liner mating with an adjacent said liner at a Z-shaped joint, so that any two adjacent said liners overlap with each other during all stages of operation.

7. The gas turbine engine according to claim 1, further characterized by said rotor blade having a substantially flat tip surface on said suction side of said rotor blade.

8. The gas turbine engine according to claim 1, further characterized by said rotor blade having a leading edge and a trailing edge, said angled surface stopping short of said leading edge and said trailing edge.

9. A gas turbine engine including a plurality of rotor blades enclosed in an engine case, said rotor blades having a root and a tip and a pressure side and a suction side, said gas turbine engine characterized by:

a plurality of variable position engine case liners disposed radially inward of said engine case and radially outward of said tips of said rotor blades, said plurality of engine case liners resiliently supported by said engine case, said plurality of engine case liners adjusting its position with respect to said tips of said rotor blades to minimize a tip clearance therebetween during all operating conditions; and each said rotor blade having an angled surface with respect to direction of rotation of said rotor blades on said pressure side of said rotor blade so that high pressure air is deflected from said angled surface radially outward to move said variable position engine case liner radially outward.

* * * * *